United States Patent
Saito et al.

(10) Patent No.: US 11,370,168 B2
(45) Date of Patent: *Jun. 28, 2022

(54) 3D MODELING DEVICE AND 3D MODELING METHOD

(71) Applicant: Seiko Epson Corporation, Tokyo (JP)

(72) Inventors: Koichi Saito, Matsumoto (JP); Shunsuke Mizukami, Hokuto (JP); Kazuhide Nakamura, Asahi (JP); Kohei Yuwaki, Shiojiri (JP)

(73) Assignee: Seiko Epson Corporation

( * ) Notice: Subject to any disclaimer, the term of this patent is extended or adjusted under 35 U.S.C. 154(b) by 65 days.

This patent is subject to a terminal disclaimer.

(21) Appl. No.: 17/022,230

(22) Filed: Sep. 16, 2020

(65) Prior Publication Data

US 2021/0001550 A1 Jan. 7, 2021

Related U.S. Application Data

(63) Continuation of application No. 16/109,820, filed on Aug. 23, 2018, now Pat. No. 10,857,731.

(30) Foreign Application Priority Data

Aug. 24, 2017 (JP) .............................. JP2017-161069

(51) Int. Cl.
*B29C 64/245* (2017.01)
*B33Y 10/00* (2015.01)
(Continued)

(52) U.S. Cl.
CPC .......... *B29C 64/245* (2017.08); *B29C 64/106* (2017.08); *B29C 64/118* (2017.08);
(Continued)

(58) Field of Classification Search
CPC ... B29C 64/245; B29C 64/106; B29C 64/118; B29C 64/209; B33Y 10/00; B33Y 30/00; B33Y 50/02
See application file for complete search history.

(56) References Cited

U.S. PATENT DOCUMENTS 10,857,731 B2 * 12/2020 Saito ................. B29C 64/209
2016/0009010 A1 1/2016 Kariya et al.
(Continued)

FOREIGN PATENT DOCUMENTS

JP 03-002030 A 1/1991
JP 2006-192710 A 7/2006
(Continued)

*Primary Examiner* — Nahida Sultana
(74) *Attorney, Agent, or Firm* — Harness, Dickey & Pierce, P.L.C.

(57) ABSTRACT

A 3D modeling device that forms a 3D object includes: a stage; a nozzle through which a fused material is ejected; a build plate disposed on the stage, the build plate receiving the fused material ejected through the nozzle to build the 3D object on the build plate; and a plasticizing member configured to plasticize a thermoplastic material to form the fused material. The plasticizing member includes: a flat screw having a grooved surface in which a groove is provided, the groove extending in a helical shape; a screw-facing piece having a communication path and a screw-facing surface facing the grooved surface; and a drive motor configured to rotate the flat screw. The groove continuously helically extends toward a material inlet from which the thermoplastic material in solid form is supplied, and the material inlet is provided on a side face of the flat screw.

11 Claims, 8 Drawing Sheets

(51) Int. Cl.
  *B29C 64/118* (2017.01)
  *B29C 64/209* (2017.01)
  *B33Y 30/00* (2015.01)
  *B29C 64/106* (2017.01)
  *B33Y 50/02* (2015.01)

(52) U.S. Cl.
  CPC ............ *B29C 64/209* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2016/0096326 A1 | 4/2016 | Naware |
| 2016/0144535 A1 | 5/2016 | Touma |
| 2016/0311162 A1 | 10/2016 | Liu et al. |
| 2017/0210068 A1 | 7/2017 | Kunioka |
| 2017/0210069 A1 | 7/2017 | Stubenruss |
| 2017/0291364 A1 | 10/2017 | Womer |
| 2018/0007949 A1 | 1/2018 | Sung et al. |
| 2018/0126412 A1 | 5/2018 | Huang et al. |
| 2018/0186058 A1 | 7/2018 | Busgen et al. |
| 2020/0024465 A1 | 1/2020 | Dylla-Spears et al. |
| 2020/0147863 A1 | 5/2020 | Coulter |

FOREIGN PATENT DOCUMENTS

| | | |
|---|---|---|
| JP | 2016-097588 A | 5/2016 |
| JP | 2016-104555 A | 6/2016 |
| JP | 2016-203597 A | 12/2016 |
| JP | 2017-132073 A | 8/2017 |
| WO | 2016/020150 A1 | 2/2016 |
| WO | 2017/001325 A1 | 1/2017 |

* cited by examiner

| | ROOM TEMPERATURE | 80°C | 100°C | 105°C | 110 TO 117°C | 120°C |
|---|---|---|---|---|---|---|
| | | | TEMPERATURE | | | |
| SHAPE OF BOTTOM LAYER | C | C | B | B | A | A |
| QUALITY OF BOTTOM SURFACE | A | C | C | C | A | B |

3D MODELING DEVICE AND 3D MODELING METHOD

CROSS-REFERENCE TO RELATED APPLICATIONS

This application is continuation of application Ser. No. 16/109,820 filed Aug. 23, 2018, which claims priority under 35 U.S.C. § 119 to Japanese Patent Application No. 2017-161069 filed on Aug. 24, 2017, which are expressly incorporated by reference herein in their entireties.

BACKGROUND

1. Technical Field

The present invention relates to a three-dimensional (hereinafter, 3D) modeling device and a 3D modeling method.

2. Related Art 3D modeling devices are known that are configured to form a 3D object (hereinafter, simply "object"), by ejecting a fused thermoplastic material through a nozzle onto a build plate so as to accumulate layers of the thermoplastic material, and curing the same, for example as disclosed in JP-A-2006-192710.

With such a 3D modeling device, the material constituting the bottom layer of the object may contract, owing to a sharp drop in temperature on the build plate, thereby causing the bottom portion of the object to be separated from the build plate. In such a case, it becomes difficult to stably accumulate the layers of the material. Thus, the existing 3D modeling devices still have a room for improvement, in terms of suppressing the degradation in modeling accuracy, originating from the contraction of the material on the build plate.

SUMMARY

Accordingly, the invention may be advantageously realized as exemplified hereunder.

In an aspect, the invention provides a 3D modeling device that forms a 3D object. The 3D modeling device includes a nozzle through which a fused material obtained by plasticizing a thermoplastic material is ejected, and a build plate for receiving the fused material ejected through the nozzle. The build plate includes a contraction prevention unit that prevents the fused material from contracting upon being cured.

With the 3D modeling device configured as above, the contraction prevention unit prevents the material from contracting on the build plate, and therefore degradation in modeling accuracy originating from the contraction of the material can be suppressed.

In the foregoing 3D modeling device, the contraction prevention unit may include a heating unit that heats the fused material.

With the 3D modeling device configured as above, the heat from the heating unit serves to suppress a sharp drop in temperature of the fused material stuck to the build plate, compared with the case where the fused material is not heated. Accordingly, the material is prevented from contracting on the build plate. Consequently, degradation in modeling accuracy originating from the contraction of the material can be suppressed.

In the foregoing 3D modeling device, the contraction prevention unit may include a serrated layer constituting a serrated structure on the surface of the build plate to which the fused material is stuck.

With the 3D modeling device configured as above, the serrated layer on the build plate prevents the fused material from migrating on the build plate, thereby suppressing the contraction of the material.

In the foregoing 3D modeling device, the contraction prevention unit may include a fiber layer formed of a fiber.

With the 3D modeling device configured as above, the fiber layer enhances the adhesion of the fused material to the build plate, thereby preventing the material from migrating. In addition, the fiber layer also serves as a thermal insulation layer, so as to suppress heat transfer from the fused material, which minimizes the drop in temperature of the fused material. Consequently, the contraction of the material on the build plate can be suppressed.

In the foregoing 3D modeling device, the fiber layer may be formed of wood or paper.

In this case, since the wood or paper is commonly available, the fiber layer can be easily prepared.

In the foregoing 3D modeling device, the fiber layer may include, on a surface thereof, a coating layer formed of a material that melts upon being contacted by the fused material.

In this case, the coating layer which has melted enhances the adhesion of the fused material to the build plate, thereby suppressing the contraction of the material on the build plate more effectively. In addition, since the material of the coating layer is stuck to the bottom surface of the object, the bottom surface can be smoothed.

In the foregoing 3D modeling device, the fiber layer may be formed of coated paper having the coating layer on a surface thereof.

In this case, since the coated paper is commonly available and easy to handle, the fiber layer having the coating layer can be easily formed. In addition, since the coated paper has high surface smoothness, the bottom surface of the object can be made smoother.

In the foregoing 3D modeling device, the coating layer may include color ink.

In this case, the coloring of the object can be easily performed, with the color ink contained in the coating layer.

In the foregoing 3D modeling device, the contraction prevention unit may be removably provided on the build plate.

The mentioned configuration facilitates the maintenance work for the build plate and the contraction prevention unit.

The foregoing 3D modeling device may further include a processing chamber accommodating the nozzle and the build plate, and a temperature controller that adjusts an atmospheric temperature in the processing chamber.

With the 3D modeling device configured as above, a sharp drop in temperature of the fused material can be suppressed by adjusting the temperature in the processing chamber, and therefore the contraction of the material on the build plate can be suppressed.

The foregoing 3D modeling device may further include a plasticizing unit, including a flat screw having a groove extending in a swirl shape and a drive motor that rotates the flat screw, the plasticizing unit being configured to conduct the fused material to the nozzle through the groove, by rotating the flat screw.

The 3D modeling device configured as above allows reduction in size of the 3D modeling device. In addition, the flow rate of the fused material ejected through the nozzle can be accurately controlled.

In another aspect, the invention provides a method of forming a 3D object. The 3D modeling method includes preparing a build plate for receiving a fused material ejected through a nozzle, the build plate including a fiber layer, having a serrated surface and serving as a contraction prevention unit that prevents the fused material from contracting upon being cured, and ejecting the fused material through the nozzle thereby sticking the fused material to the fiber layer of the build plate, and curing the fused material.

With the 3D modeling method arranged as above, the fiber layer serving as the contraction prevention unit prevents degradation in modeling accuracy originating from the contraction of the material on the build plate.

Not all of constituent elements of the foregoing device and method are indispensable, but some of them may be modified, omitted, or substituted with a different constituent elements, or a part of the limitation may be deleted, to eliminate a part or the whole of the conventional drawbacks, or attain a part or the whole of the foregoing advantageous effects. Further, a part or the whole of the foregoing technical features may be combined with a part or the whole of other features, thus to create an independent embodiment, to eliminate a part or the whole of the conventional drawbacks, or attain a part or the whole of the foregoing advantageous effects.

The invention may be realized in various other forms than the 3D modeling device and the 3D modeling method. For example, the invention is applicable to a build plate, a method of accumulating a fused material, and a contraction prevention unit for various materials.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
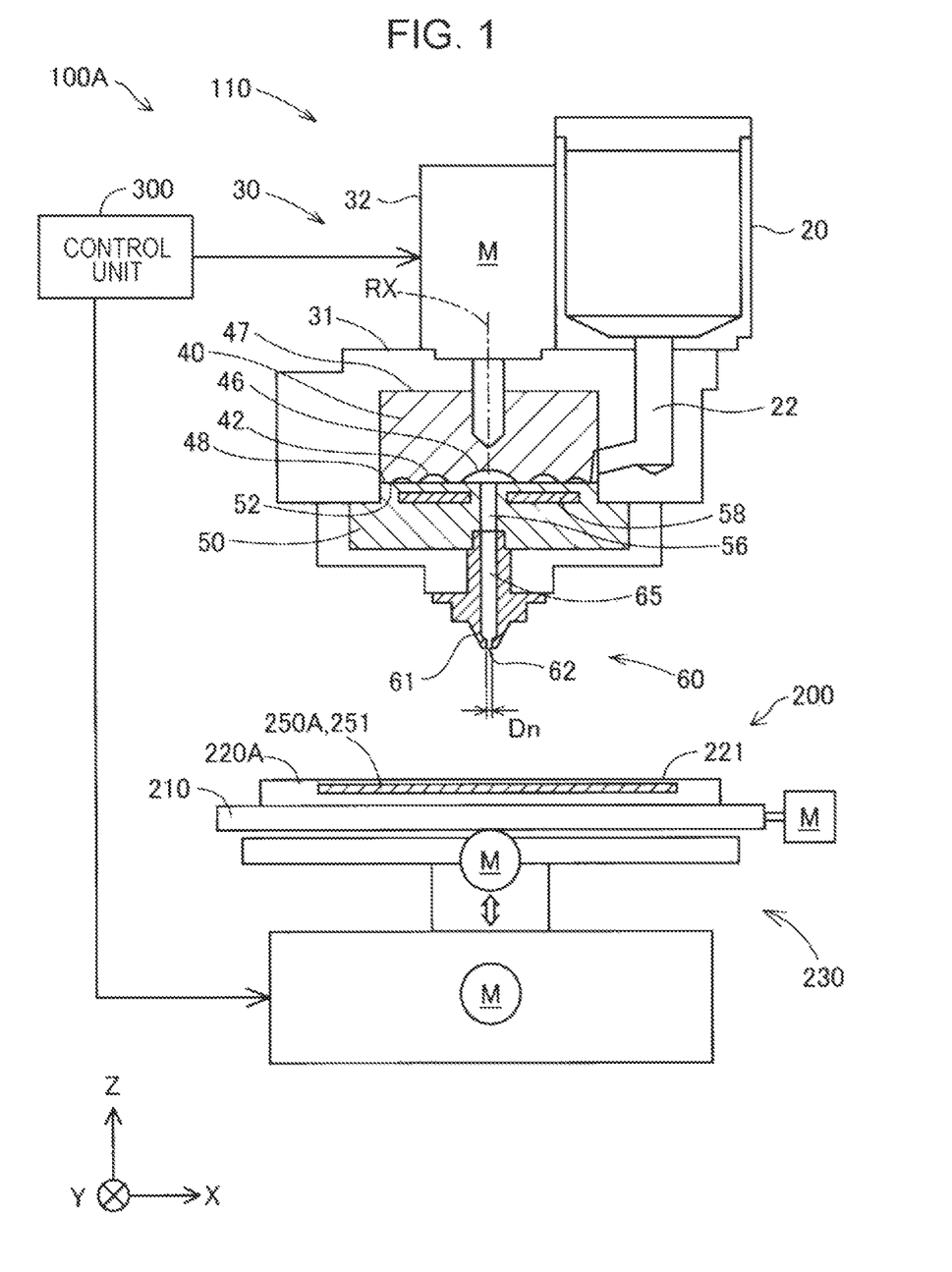
FIG. 1 is a schematic drawing showing a configuration of a 3D modeling device according to a first embodiment.

FIG. 1 is a schematic drawing showing a configuration of a 3D modeling device 100A according to a first embodiment. FIG. 1 includes arrows respectively indicating an X, Y, and Z-directions which are orthogonal to each other. The X-direction and the Y-direction are parallel to a horizontal plane, and the Z-direction denotes a direction opposite to the gravity direction (vertically downward). The arrows indicating the X, Y, and Z-directions are also included in other drawings so as to correspond to FIG. 1, where appropriate.

The 3D modeling device 100A includes an ejection unit 110, a modeling stage unit 200, and a control unit 300. The 3D modeling device 100A forms a 3D object under the control of the control unit 300, by ejecting a fused material obtained by plasticizing a thermoplastic material, through a nozzle 61 of the ejection unit 110 onto a build plate 220A of the modeling stage unit 200, and curing the fused material. The term "plasticizing" herein refers to a process through which the material is subjected to heat so as to be fused.

The ejection unit 110 includes a material supply unit 20, a plasticizing unit 30, and a head unit 60. The material supply unit 20 includes a hopper, and an outlet located on the bottom thereof is connected to the plasticizing unit 30 via a communication path 22. The material supply unit serves to supply the thermoplastic material to the plasticizing unit 30.

Examples of the material that may be loaded in the material supply unit 20 include a polypropylene resin (PP), a polyethylene resin (PE), a polyoxymethylene resin (POM), a polyvinyl chloride resin (PVC), a polyamide resin (PA), an acrylonitrile butadiene styrene resin (ABS), a polylactic acid resin (PLA), a polyphenylene sulfide resin (PPS), polyetheretherketone (PEEK), and polycarbonate (PC). The material is loaded in the material supply unit 20 in a solid form, such as pellets or powder. The thermoplastic material to be loaded in the material supply unit 20 may contain a pigment, a metal, or a ceramic.

The plasticizing unit 30 plasticizes the mentioned material and introduces the material into the head unit 60. The plasticizing unit 30 includes a screw case 31, a drive motor 32, a flat screw 40, and a screw-facing piece 50.

The flat screw 40 has a generally circular column shape, having a height in the axial direction (along the central axis) shorter than the diameter, and includes a groove 42 formed on a lower face 48 intersecting a rotation axis RX. The communication path 22 of the material supply unit 20 connects between the side face of the flat screw 40 and the groove 42. The specific shape of the flat screw 40 will be subsequently described.

The flat screw 40 is oriented such that the axial direction extends parallel to the Z-direction, and set to rotate along the circumferential direction. In FIG. 1, the rotation axis RX of the flat screw 40 is indicated by a dash-dot line. In the first embodiment, the central axis of the flat screw 40 and the rotation axis RX coincide with each other.

The flat screw 40 is accommodated in the screw case 31. The flat screw 40 has an upper face 47 connected to the drive motor 32, to be made to rotate inside the screw case 31 by the rotational driving force generated by the drive motor 32. The drive motor 32 is controlled by the control unit 300.

The lower face 48 of the flat screw 40 is opposed to an upper face 52 of the screw-facing piece 50, such that a gap is defined between the groove 42 in the lower face 48 of the flat screw 40 and the upper face 52 of the screw-facing piece 50. In the ejection unit 110, the material is supplied to the gap between the flat screw 40 and the screw-facing piece 50, from the material supply unit 20.

A heater 58 for heating the material is embedded in the screw-facing piece 50. The material supplied into the groove 42 of the flat screw 40 flows along the groove 42 when the flat screw 40 rotates, while being plasticized and transformed into the fused material, and led to a central region 46 of the flat screw 40, as will be subsequently described in further detail. The fused material which has reached the central region 46 is supplied to the head unit 60, through a communication path 56 provided at the center of the screw-facing piece 50.

The head unit 60 includes the nozzle 61, and a flow path 65. The nozzle 61 ejects the fused material from an ejection port 62 located at the tip portion. The ejection port 62 includes a bore Dn of a predetermined size. The nozzle 61 is connected to the communication path 56 of the screw-facing piece 50, via the flow path 65. The flow path 65 serves as the flow path for the fused material between the flat screw 40 and the nozzle 61. The fused material plasticized in the plasticizing unit 30 flows to the flow path 65 through the communication path 56, and is ejected onto the build plate 220A of the modeling stage unit 200, from the ejection port 62 of the nozzle 61.

Employing the flat screw 40 as the mechanism for ejecting the fused material in the 3D modeling device 100A contributes to reducing the size of the ejection unit 110 in the Z-direction. In addition, the ejection flow rate of the fused material from the nozzle 61 can be controlled with high accuracy, by adjusting the rotation speed of the drive motor 32.

In the first embodiment, the fused material is heated to a temperature higher than the glass transition point thus to be completely fused, when ejected from the nozzle 61. For example, the ABS resin has a glass transition point of approximately 120° C., and is heated to approximately 200° C. when ejected from the nozzle 61. Accordingly, a heater may be provided around the nozzle 61, to eject the fused material at a high temperature.

The modeling stage unit 200 includes a table 210, the build plate 220A mounted on the table 210, and a moving mechanism 230 for displacing the build plate 220A. The build plate 220A receives the fused material ejected from the nozzle 61. The moving mechanism 230 includes a tri-axis positioner that moves the build plate 220A in three directions namely the X, Y, and Z-directions, with the driving force of three motors M. The modeling stage unit 200 changes the relative positional relation between the nozzle 61 and the build plate 220A, under the control of the control unit 300.

The build plate 220A includes a contraction prevention unit 250A that suppresses the fused material from contracting on the build plate 220A, upon being cured. The contraction prevention unit 250A according to the first embodiment includes a heating unit 251 that heats the fused material. The heating unit 251 may be constituted of, for example, an electric heater. In the first embodiment, the heating unit 251 is embedded inside the build plate 220A, so as to heat a build surface 221 on which the fused material lands.

Here, the heating unit 251 may be provided outside the build plate 220A, instead of being embedded therein. It suffices that the heating unit 251 is located at a position that allows the fused material that has landed on the build plate 220A to be heated.

The control unit 300 may be realized, for example, as a computer including a processor such as a CPU, a main memory, and a non-volatile memory. The non-volatile memory in the control unit 300 contains a computer program for controlling the 3D modeling device 100A. The control unit 300 executes the modeling of the 3D object, by driving the ejection unit 110 and the moving mechanism 230 of the build plate 220A, so as to eject the fused material to a coordinate position on the build plate 220A based on modeling data, and curing the material.

Figure 2:
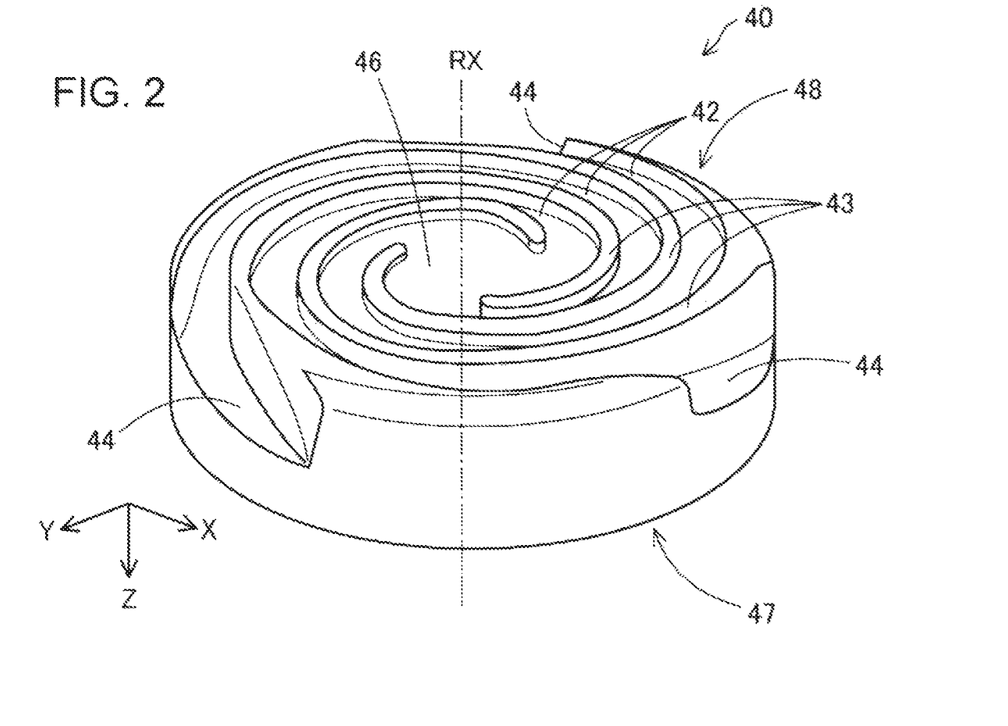
FIG. 2 is a schematic perspective view showing a flat screw.

FIG. 2 is a schematic perspective view showing the configuration of the flat screw 40, on the side of the lower face 48. In FIG. 2, the position of the rotation axis RX, about which the flat screw 40 of the plasticizing unit 30 rotates, is indicated by a dash-dot line. As already described, the lower face 48 of the flat screw 40, opposing the screw-facing piece 50 (see FIG. 1), includes the groove 42. Hereinafter, the lower face 48 may also be referred to as a "grooved surface 48".

The central region 46 of the grooved surface 48 of the flat screw 40 is formed as a recessed portion to which an end portion of the groove 42 is connected. The central region 46 is opposed to the communication path 56 (see FIG. 1) of the screw-facing piece 50. In the first embodiment, the central region 46 is oriented so as to intersect the rotation axis RX.

The groove 42 of the flat screw 40 constitutes what is known as a scroll groove. The groove 42 extends in a swirl shape so as to draw an arc, from the central region 46 toward the outer periphery of the flat screw 40. The groove 42 may also be formed so as to extend in a helical shape. The flat screw 40 illustrated in FIG. 2 constitutes sidewalls of three grooves 42, and includes three ribs 43 extending along the respective groove 42. However, the number of grooves 42 and ribs 43 formed in the flat screw 40 is not limited to three. The flat screw 40 may include only a single groove 42, or a plurality of grooves 42 not fewer than two. Likewise, a desired number of ribs 43 may be provided, according to the number of grooves 42.

The grooves 42 each continuously extends to a material inlet 44 provided on the side face of the flat screw 40. The material supplied from the communication path 22 (see FIG. 1) of the material supply unit 20 is received through the material inlet 44. The flat screw 40 illustrated in FIG. 2 includes three material inlets 44. The number of material inlets 44 formed in the flat screw 40 is not limited to three. The flat screw 40 may include only a single material inlet 44, or a plurality of material inlets 44 not fewer than two. Likewise, a desired number of ribs 43 may be provided, according to the number of grooves 42.

When the flat screw 40 rotates, the material received through the material inlet 44 is heated in the groove 42, thus to be plasticized and transformed into the fused material. The fused material flows to the central region 46 through the groove 42.

Figure 3:
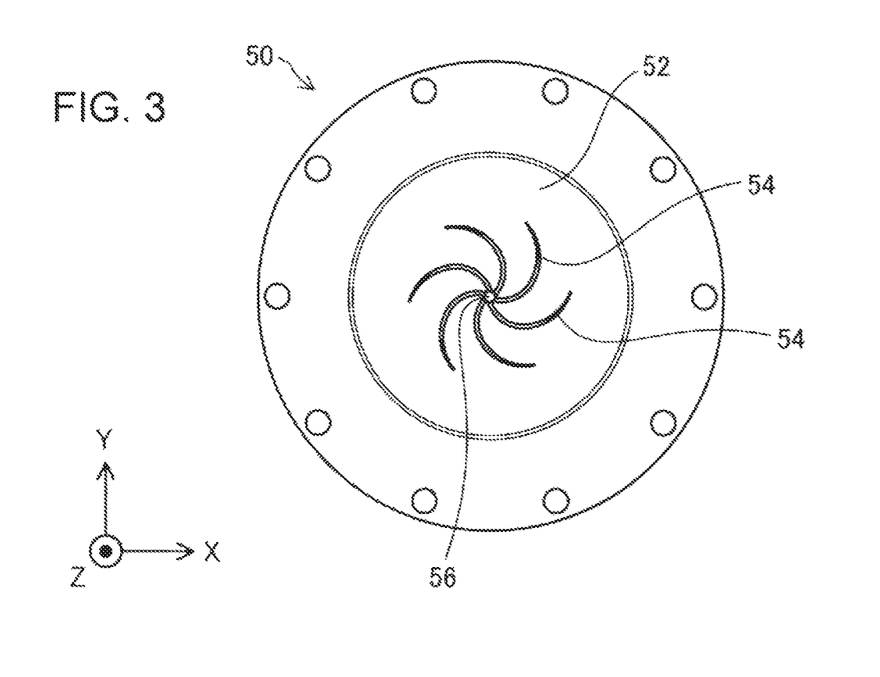
FIG. 3 is a schematic plan view of a screw-facing piece.

FIG. 3 is a schematic plan view of the upper face 52 of the screw-facing piece 50. The upper face 52 of the screw-facing piece 50 is opposed to the grooved surface 48 of the flat screw 40, as described above. Hereinafter, the upper face 52 may also be referred to as "screw-facing surface 52". At the center of the screw-facing surface 52, the communication path 56, through which the fused material is supplied to the nozzle 61, is provided.

The screw-facing surface 52 includes a plurality of guide grooves 54 each connected to the communication path 56 and extending therefrom in a swirl shape toward the outer periphery. The guide grooves 54 each serve to conduct the fused material to the communication path 56. As described above, the heater 58 for heating the material is embedded in the screw-facing piece 50 (see FIG. 1). The plasticizing of the material by the plasticizing unit 30 is realized by the heating with the heater 58 and the rotation of the flat screw 40.

Figure 4:
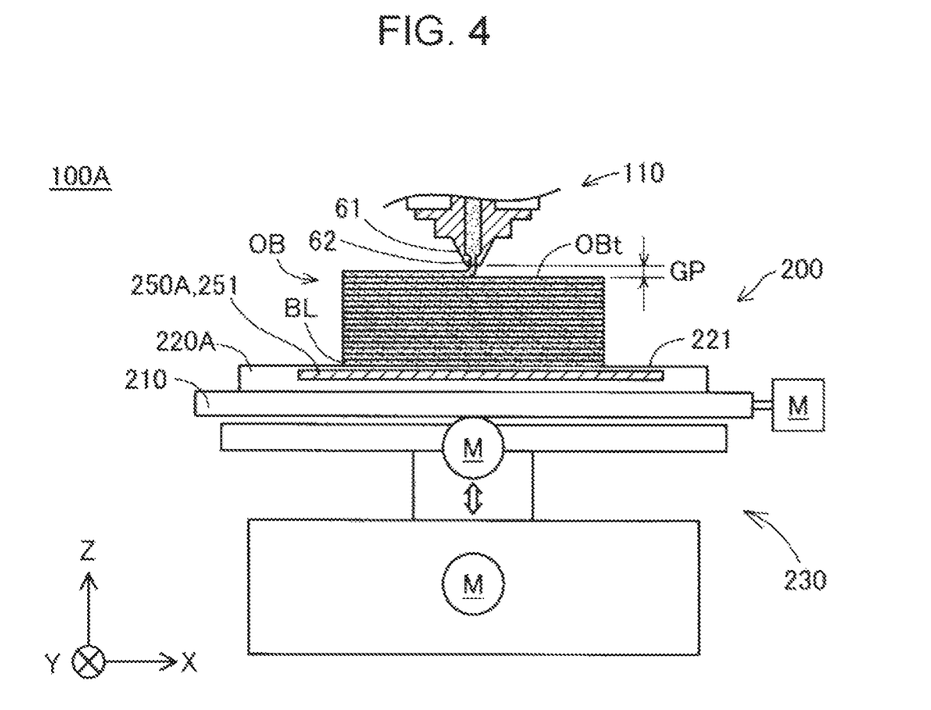
FIG. 4 is a schematic drawing showing how a 3D object is formed on a build plate.

FIG. 4 is a schematic drawing showing how the 3D object OB is formed on the build plate 220A. Through the modeling operation performed by the 3D modeling device 100A, the 3D object OB (hereinafter, simply "object OB" as the case may be) is formed by accumulating layers of the material, each constituted of the fused material, ejected onto the build plate 220A from the nozzle 61 and then cured.

During the modeling operation by the 3D modeling device 100A, a gap GP of a predetermined distance is provided, between the ejection port 62 at the tip portion of the nozzle 61 and an upper face OBt, on which the material layer about to be formed is accumulated. Here, the term "upper face OBt on which the material layer is accumulated" refers to a region in the vicinity of the position right under the nozzle 61, where the fused material ejected from the nozzle 61 is assumed to be accumulated. The position of the upper face OBt corresponds, when a bottom layer BL of the object OB is formed on the build surface 221, which is the upper face of the build plate 220A, to the level of the build surface 221. When one or more of the material layers have been formed right under the nozzle 61, and an additional material layer is to be formed, the position of the upper face OBt corresponds to the level of the top surface of the material layers, as shown in FIG. 4.

Preferably, the size of the gap GP may be equal to or larger than the bore Dn of the ejection port 62 of the nozzle 61, and more preferably equal to or larger than 110% of the bore Dn. In this case, the fused material ejected from the ejection port 62 of the nozzle 61 is accumulated on the upper face OBt on which the material layer is about to be formed, in a free state without being pressed against the upper face OBt. Accordingly, the cross-sectional shape of the fused material ejected from the nozzle 61 can be prevented from collapsing, and the surface of the 3D object OB can be made less rough. In the case where the heater is provided around the nozzle 61 as described above, providing the gap GP prevents the material from being overheated by the heater, thereby preventing discoloration and degradation of the material accumulated on the 3D object OB, originating from overheating.

Preferably, further, the size of the gap GP may be equal to or smaller than 150% of the bore Dn, and more preferably equal to or smaller than 130% of the bore Dn. Such a configuration prevents degradation in ejection accuracy with respect to the position where the fused material is to be located, as well as in adhesion strength of the fused material to the upper face OBt of the 3D object OB being formed.

As described above, the build plate 220A according to the first embodiment includes the heating unit 251, serving as the contraction prevention unit 250A. During the modeling operation, the heating unit 251 heats the build surface 221 of the build plate 220A to a temperature equal to or higher than the glass transition temperature Tg of the material loaded in the material supply unit 20. More specifically, it is preferable that the heating unit 251 heats the build surface 221 of the build plate 220A to a temperature approximately 10° C. higher than the glass transition temperature Tg. Here, the control unit 300 may be configured to set the heating temperature of the heating unit 251 according to the type of the material selected by the user, at the start of the modeling operation.

Employing the heating unit 251 to heat the build surface 221 of the build plate 220A suppresses a sharp drop in temperature of the fused material that has landed on the build surface 221 to form the bottom layer BL of the object OB. In addition, the temperature is maintained while the fused material forming the bottom layer BL is cured, and therefore drastic contraction can be avoided. Accordingly, the modeling condition of the bottom layer BL can be prevented from being unstable, such as separation of the bottom layer BL from the build plate 220A. Consequently, the material layer can be stably accumulated on the bottom layer BL thereafter, and degradation in modeling accuracy originating from the contraction of the material can be suppressed.

In particular, when the build surface 221 of the build plate 220A is heated to a temperature higher than the glass transition temperature Tg of the material, the temperature of the fused material can be easily maintained at a level that prevents the fused material from being cured. In addition, heating the build surface 221 of the build plate 220A to a temperature not exceeding the glass transition temperature Tg of the material+10° C. prevents thermal degradation of the fused material forming the bottom layer BL, thereby preventing degradation of the bottom surface quality of the object OB. Further, when the heating temperature of the build surface 221 of the build plate 220A is lower than the glass transition temperature Tg of the material+10° C., the temperature of the fused material can be maintained at a level that allows the fused material to be cured to a certain extent. Therefore, the shape of the bottom layer BL can be prevented from collapsing, owing to a delay in curing of the fused material due to an excessively high heating temperature.

Figure 5:
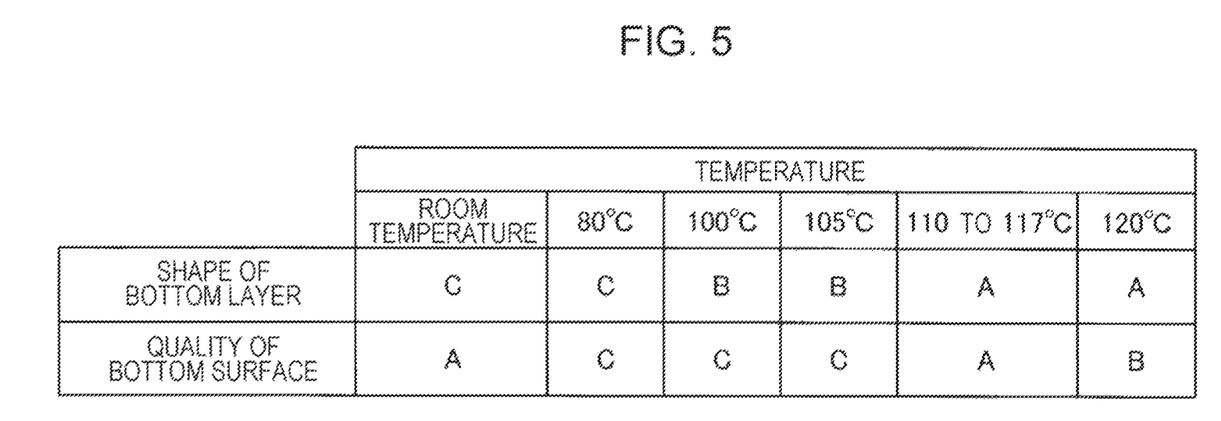
FIG. 5 is a table showing experiment results of modeling quality, obtained when an ABS resin was used as the material.

FIG. 5 is a table showing experiment results of the formation quality of the bottom layer BL, obtained when an ABS resin was used as the material. The item "temperature" in the table represents actually measured values of the temperature of the surface of the build surface 221. In this table, the evaluation "A" means that the condition was good, "B" means that the condition was slightly inferior to A, and "C" means that the condition was unacceptably inferior. The glass transition temperature Tg of the ABS resin employed in this experiment was approximately 110° C.

When the build surface 221 was not heated and kept at the room temperature, the bottom layer BL was deformed so as to concavely distorted. When the build surface 221 was heated to 80° C., the bottom layer BL was largely deformed, and the bottom surface thereof became rough. When the build surface 221 was heated to 100° C. and 105° C., the bottom layer BL was slightly distorted convexly, and the bottom surface thereof became rough. When the build surface 221 was heated to 110 to 117° C., the bottom layer BL was barely deformed, and the bottom surface thereof was finished in a smooth condition. When the build surface 221 was heated to 120° C., the quality of the bottom surface of the bottom layer BL was slightly degraded, although the deformation was barely observed. In view of such results, it may be construed that it is preferable that the heating temperature of the build surface 221 is higher than the glass transition temperature Tg of the material, but lower than the glass transition temperature Tg+10° C.

As described above, in the 3D modeling device 100A according to the first embodiment, the heating unit 251 serving as the contraction prevention unit 250A heats the fused material ejected onto the build plate 220A. Such heating maintains the temperature of the fused material on the build plate 220A, thereby preventing a sharp drop in temperature and allowing the material to be gradually cured, thus suppressing the contraction of the material. Therefore, degradation in modeling accuracy originating from the contraction of the material can be suppressed. Further, the 3D modeling device 100A according to the first embodiment, and the modeling operation performed by the 3D modeling device 100A provide various other advantageous effects, as described in the foregoing passages.

Second Embodiment

Figure 6:
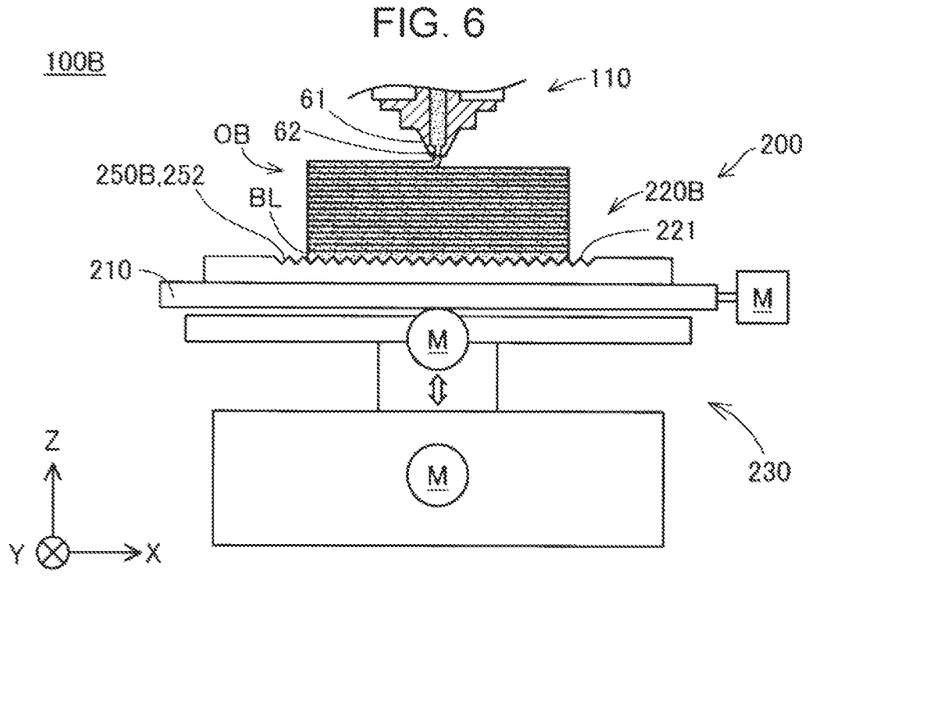
FIG. 6 is a schematic drawing showing a configuration of a 3D modeling device according to a second embodiment.

FIG. 6 is a schematic drawing showing a configuration of a 3D modeling device 100B according to a second embodiment. FIG. 6 shows a portion around the tip portion of the nozzle 61 of the ejection unit 110 and the modeling stage unit 200, to schematically illustrate how the 3D object OB is formed on the build plate 220B.

The 3D modeling device 100B according to the second embodiment is configured similarly to the 3D modeling device 100A of the first embodiment, except for including a build plate 220B in place of the build plate 220A of the first embodiment. The build plate 220B according to the second embodiment includes a contraction prevention unit 250B, which is different from the heating unit 251 serving as the contraction prevention unit 250A of the first embodiment.

The contraction prevention unit 250B according to the second embodiment includes a serrated layer 252 forming a serrated structure on the surface of the build plate 220B. In the second embodiment, the surface of the serrated layer 252 constitutes the build surface 221. On the surface of the serrated layer 252, a multitude of minute protrusions and recesses are distributed, over the entire region on the surface of the build plate 220B where the fused material is to be stuck, so as to restrict the fused material from flowing on the build surface 221.

It is preferable that the serrated structure of the serrated layer 252 is formed by surface processing of the build surface 221 of the build plate 220B, such as cutting, shotblasting, etching, or embossing. Further, it is preferable that the serrated structure of the serrated layer 252 is finely and minutely formed in the order of microns, to attain a smooth finish of the bottom surface of the bottom layer BL.

With the 3D modeling device 100B according to the second embodiment, the fused material that has landed on the build surface 221 is restricted from migrating, by the serrated structure of the serrated layer 252. Accordingly, the fused material is prevented from contracting while being cured, and therefore degradation in modeling accuracy originating from the contraction of the material on the build plate 220B can be suppressed. In addition, the 3D modeling device 100B according to the second embodiment, and the modeling operation performed by the 3D modeling device 100B provide various other advantageous effects, described above with reference to the first and second embodiments.

Third Embodiment

Figure 7:
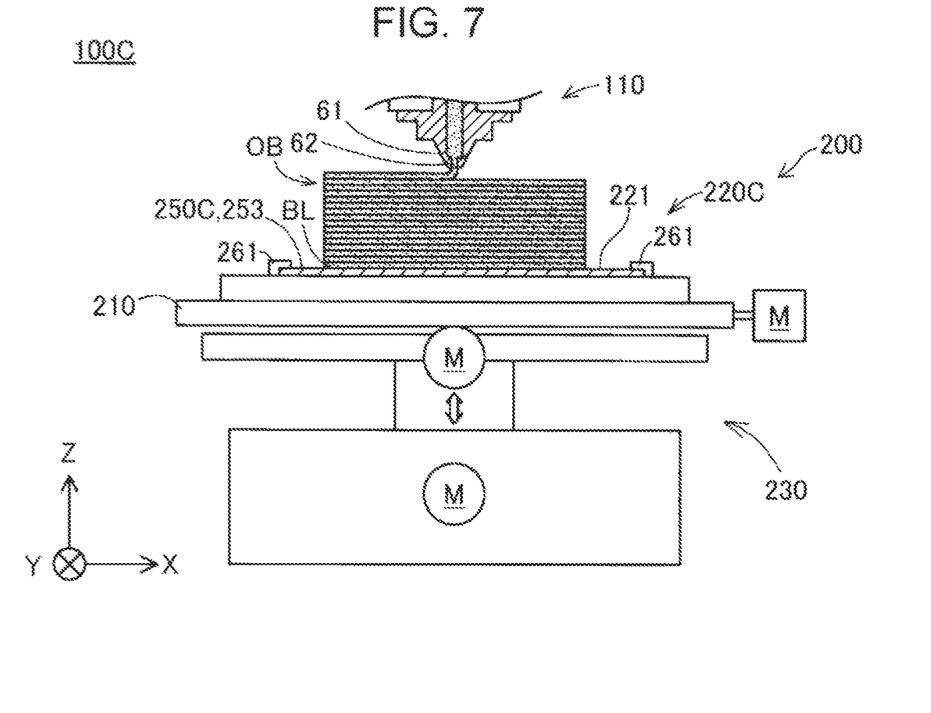
FIG. 7 is a schematic drawing showing a configuration of a 3D modeling device according to a third embodiment.

FIG. 7 is a schematic drawing showing a configuration of a 3D modeling device 100C according to a third embodiment. FIG. 7 shows a portion around the tip portion of the nozzle 61 of the ejection unit 110 and the modeling stage unit 200, to schematically illustrate how the 3D object OB is formed on a build plate 220C.

The 3D modeling device 100C according to the third embodiment is configured similarly to the 3D modeling device 100B of the second embodiment, except for including the build plate 220C in place of the build plate 220B of the second embodiment. The build plate 220C according to the third embodiment includes a fiber layer 253 serving as a contraction prevention unit 250C according to the third embodiment, in place of the serrated layer 252 serving as the contraction prevention unit 250B of the second embodiment.

The fiber layer 253 is formed of a fiber material. The fiber layer 253 possesses a serrated structure formed by entangled fibers constituting the fiber material. Examples of the fiber material that may be employed to form the fiber layer 253 include, not only those originating from animals or plants, but also those industrially manufactured, such as a carbon fiber. The fiber layer 253 may include a base material formed of wood or a material processed from woods, paper, or a fiber material formed into a cloth. In the case of wood or paper, the fiber layer 253 can be easily manufactured, since such materials are commonly available.

In the third embodiment, the surface of the fiber layer 253 constitutes the build surface 221 to which the fused material is to be stuck. The fiber layer 253 is removably attached to the build plate 220C. It is preferable to fix the fiber layer 253 in a flatly extended state, to prevent the surface of the fused material from being corrugated, when the fused material is stuck to the fiber layer 253. In the 3D modeling device 100C, the build plate 220C includes a fastening device 261 for fastening the fiber layer 253 to the build plate 220C. The fastening device 261 may include an engaging portion to be hooked with the outer periphery of the fiber layer 253, so as to hold the same. The fastening device 261 may be formed, instead of the engaging portion, of a tape bonded along the outer periphery of the fiber layer 253, an adhesive layer provided on the lower face of the fiber layer 253, or a hook-and-loop fastener.

It may be construed that a modeling method including the following process is performed by the 3D modeling device 100C, to form the object OB. The modeling method includes, at least, preparing the build plate 220C by locating the fiber layer 253 serving as the contraction prevention unit 250C, and ejecting the fused material from the nozzle 61 onto the fiber layer 253 serving as the contraction prevention unit 250C of the build plate 220C so as to stick the fused material to the contraction prevention unit 250C, and curing the fused material.

With the 3D modeling device 100C and the modeling method according to the third embodiment, the fiber layer 253 restricts the fused material from migrating, thereby suppressing the contraction of the material on the build plate 220C. Therefore, degradation in modeling accuracy originating from the contraction of the material can be suppressed. In addition, minute voids among the fibers in the fiber layer 253 act as a thermal insulation layer, to suppress a sharp drop in temperature of the fused material, and therefore the contraction of the material on the build plate 220C is more effectively suppressed. Further, since the serrated structure of the fiber layer 253 is formed of the entanglement of fine fibers, the bottom surface of the bottom layer BL of the object OB can be prevented from being rough. Still further, the fiber layer 253 provided as the build surface 221 facilitates the object OB to be separated from the build surface 221, after the modeling operation has been completed. The fiber layer 253 is removably attached to the build plate 220C in the 3D modeling device 100C according to the third embodiment, and therefore the maintenance work of the build plate 220C and the fiber layer 253, such as replacement, repair, and cleaning, can be smoothly performed. In addition, the 3D modeling device 100C and the modeling method according to the third embodiment provide various other advantageous effects, described above with reference to the foregoing embodiments.

Fourth Embodiment

Figure 8:
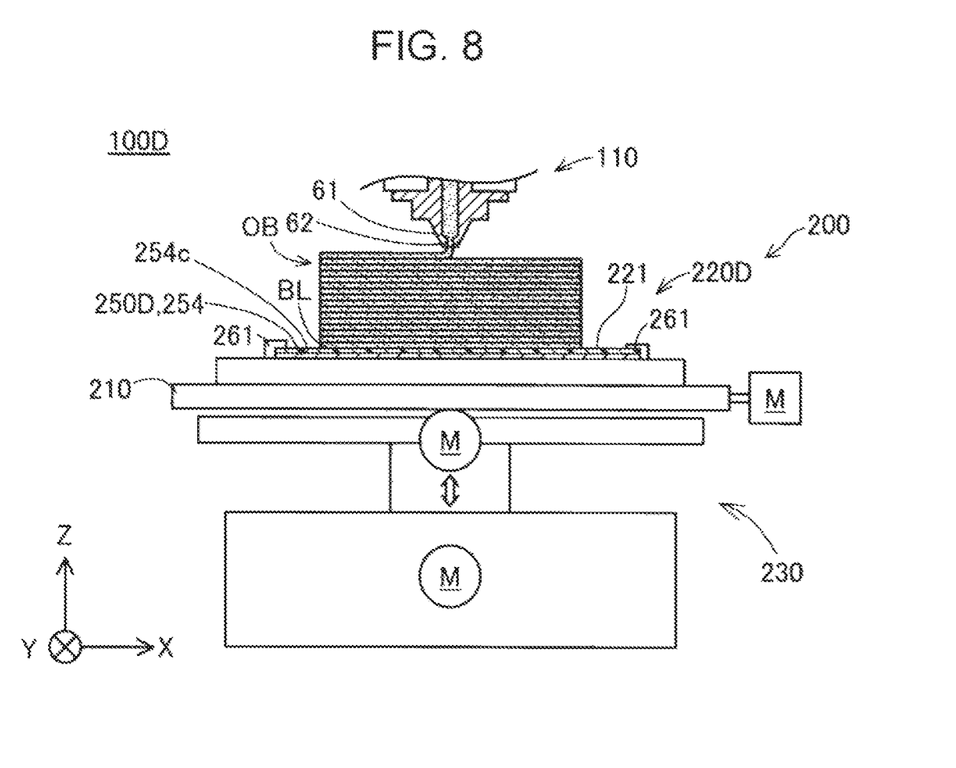
FIG. 8 is a schematic drawing showing a configuration of a 3D modeling device according to a fourth embodiment.

FIG. 8 is a schematic drawing showing a configuration of a 3D modeling device 100D according to a fourth embodiment. FIG. 8 shows a portion around the tip portion of the nozzle 61 of the ejection unit 110 and the modeling stage unit 200, to schematically illustrate how the 3D object OB is formed on a build plate 220D.

The 3D modeling device 100D according to the fourth embodiment is configured similarly to the 3D modeling device 100C of the third embodiment, except for including the build plate 220D in place of the build plate 220C of the third embodiment. The build plate 220D according to the fourth embodiment includes a fiber layer 254 serving as a contraction prevention unit 250D according to the fourth embodiment, in place of the fiber layer 253 serving as the contraction prevention unit 250C of the third embodiment.

The fiber layer 254 according to the fourth embodiment is similar to the fiber layer 253 of the third embodiment, except for including a coating layer 254c provided on the surface of the fiber layer 254. The fiber layer 254 constitutes a serrated layer having a serrated structure, formed of entangled fibers and coated with the coating layer 254c.

The coating layer 254c on the surface of the fiber layer 254 is formed of a material that melts upon being contacted by the fused material ejected from the nozzle 61. Examples of such materials include a resin, a pigment, and a paint. It is preferable that the material constituting the coating layer 254c can be mixed, upon melting, with the fused material ejected from the nozzle 61. The coating layer 254c is formed so as to cover at least a region on the surface of the fiber layer 254 where the fused material is assumed to be stuck.

Here, the fiber layer 254 may include coated paper used for printing. The coating layer 254c formed of the coated paper is obtained by applying a mixture of a paint such as pigment and an adhesive to the paper surface. Since such coated paper is commonly available and easy to handle, the fiber layer 254 can be formed with increased ease. In addition, the bottom surface of the object OB can be made smoother.

During the modeling operation performed by the 3D modeling device 100D, the fiber layer 254 including the coating layer 254c more effectively suppresses the contraction of the material constituting the bottom layer BL. Presumably, this is because the material constituting the superficial portion of the coating layer 254c melts when the fused material is stuck to the fiber layer 254, thus to be mixed with the fused material and then cured, and resultantly the adhesion strength of the material to the fiber layer 253 is enhanced. With the 3D modeling device 100D, further, the material of the coating layer 254c of the fiber layer 254, melted and stuck to the bottom surface of the bottom layer BL of the object OB, contributes to making the bottom surface of the bottom layer BL smoother. In addition, the 3D modeling device 100D according to the fourth embodiment, and the modeling operation performed by the 3D modeling device 100D provide various other advantageous effects, described above with reference to the foregoing embodiments.

Fifth Embodiment

Figure 9:
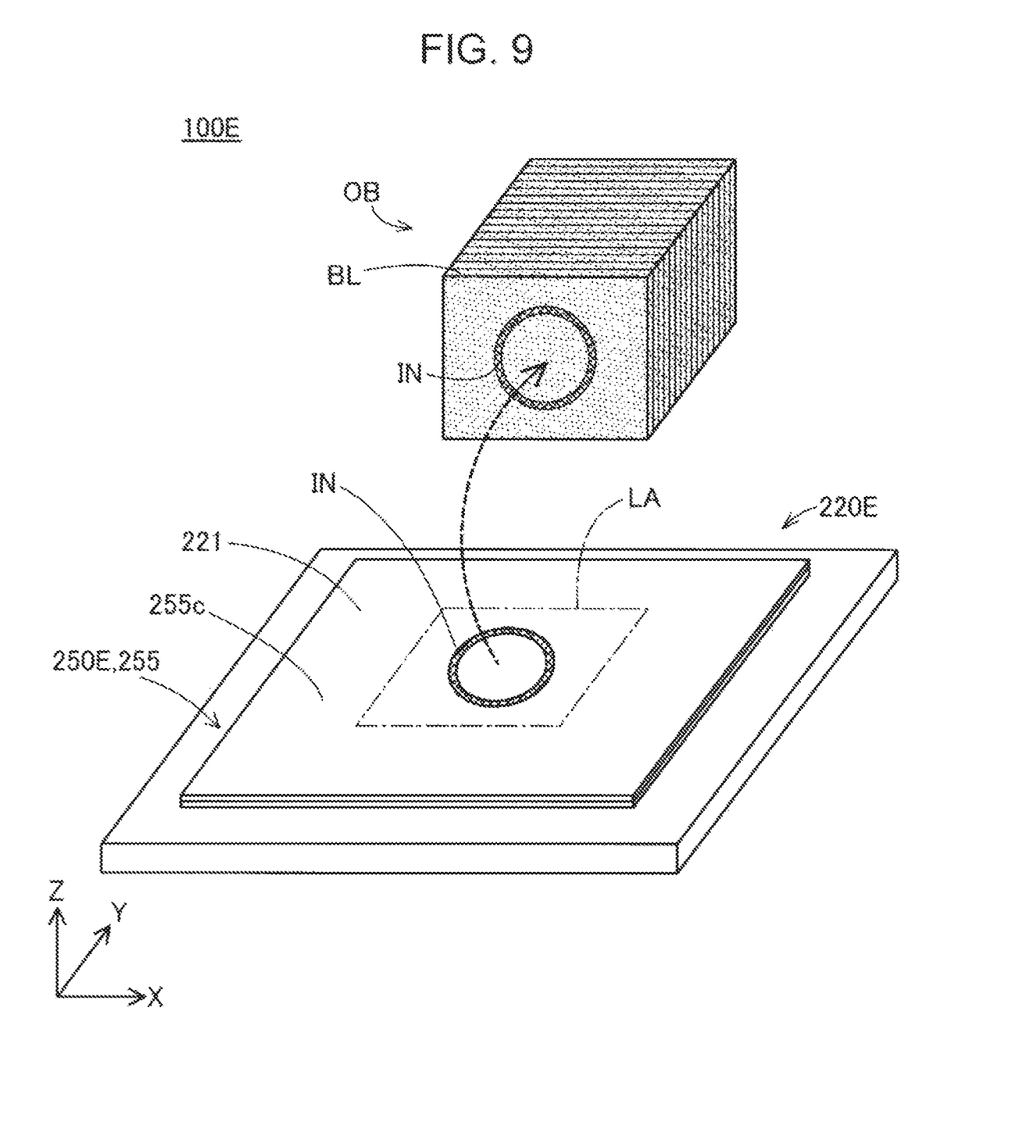
FIG. 9 is a schematic drawing for explaining a 3D modeling device and a modeling method according to a fifth embodiment.

Referring now to FIG. 9, a 3D modeling device 100E and a modeling method according to a fifth embodiment will be described. FIG. 9 only shows a build plate 220E including a fiber layer 255 according to the fifth embodiment, out of the configuration of the 3D modeling device 100E. FIG. 9 also schematically illustrates the object OB, formed on the fiber layer 255 constituting the build surface 221 and removed therefrom. In FIG. 9, the fastening device 261 is omitted for the sake of clarity. A region LA on the build surface 221, where the object OB has been located, is indicated by a dash-dot line.

The 3D modeling device 100E according to the fifth embodiment is configured similarly to the 3D modeling device 100D of the fourth embodiment, except for including the build plate 220E in place of the build plate 220D of the fourth embodiment. The build plate 220E according to the fifth embodiment includes a fiber layer 255 serving as a contraction prevention unit 250E according to the fifth embodiment, in place of the fiber layer 254 serving as the contraction prevention unit 250D of the fourth embodiment. The fiber layer 255 according to the fifth embodiment is similar to the fiber layer 254 of the fourth embodiment, except for including a coating layer 255c in place of the coating layer 254c described with reference to the fourth embodiment.

The coating layer 255c according to the fifth embodiment is similar to the coating layer 254c of the fourth embodiment, except for containing a color ink IN. The color ink IN may be applied or stuck to the surface of the coating layer 255c, or impregnated in the coating layer 255c. Alternatively, the color ink IN may be contained in the coating layer 255c in advance, as part of the components thereof. The coating layer 255c may include an image formed by the color ink IN. In the case where the fiber layer 254 is formed of the coated paper, the color ink IN can be applied to the coating layer 255c by a printing process.

In the modeling operation, the color ink IN in the coating layer 255c is transferred to the bottom surface of the bottom layer BL of the object OB, together with the material constituting the coating layer 255c. Therefore, with the 3D modeling device 100E according to the fifth embodiment, coloring or printing of an image on the object OB can be easily performed. Further, it may be assumed that the 3D modeling device 100E according to the fifth embodiment is configured to execute a modeling method including preparing the build plate 220E by locating the fiber layer 255 including the coating layer 255c containing the color ink IN, and transferring the color ink IN to the object OB by ejecting the fused material onto the fiber layer 255 to form the object.

As described above, with the 3D modeling device 100E and the modeling method according to the fifth embodiment, the fiber layer 255 contributes to suppressing degradation in modeling accuracy originating the contraction of the material on the build plate 220E, and the coloring for the object OB can be easily and efficiently performed. In addition, the 3D modeling device 100E and the modeling method according to the fifth embodiment provide various other advantageous effects, described above with reference to the foregoing embodiments.

Sixth Embodiment

Figure 10:
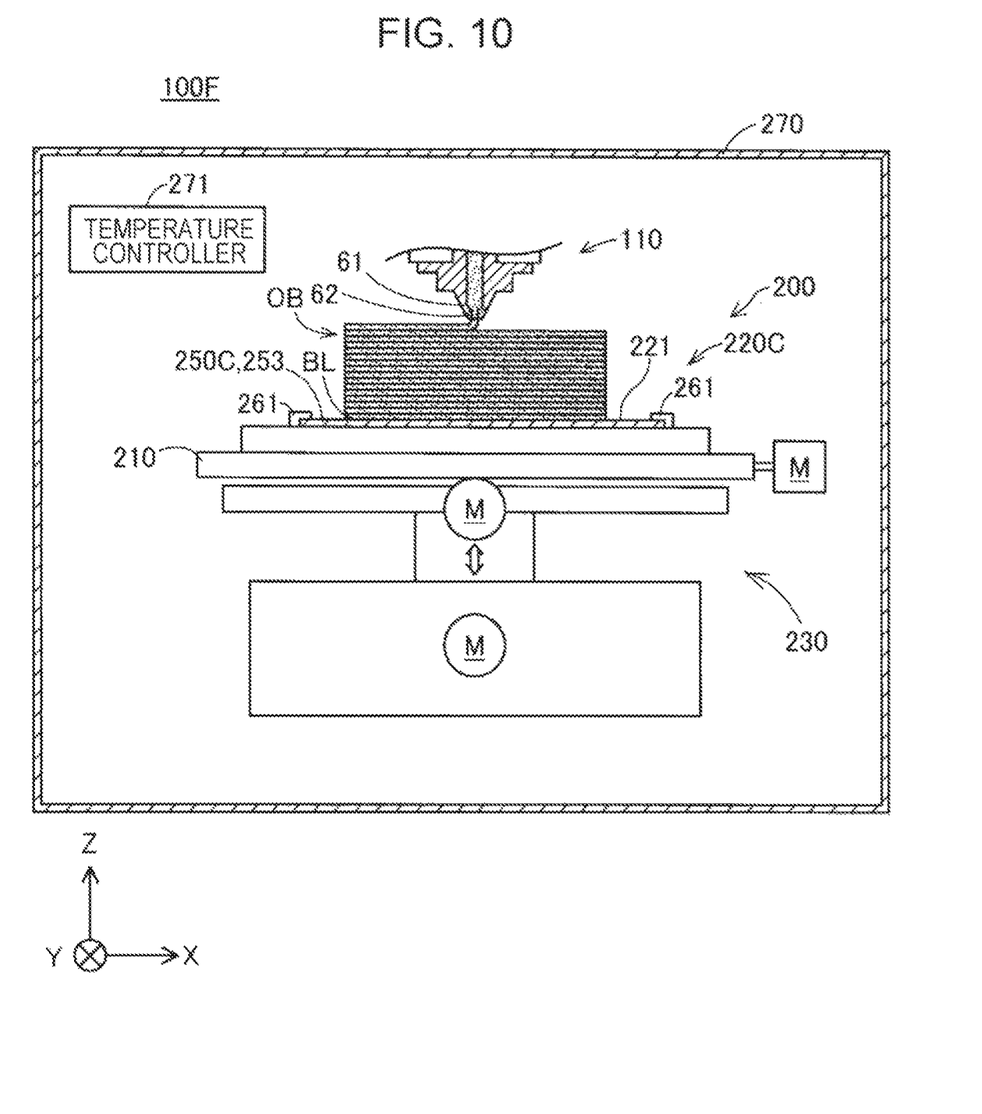
FIG. 10 is a schematic drawing showing a configuration of a 3D modeling device according to a sixth embodiment.

FIG. 10 is a schematic drawing showing a configuration of a 3D modeling device 100F according to a sixth embodiment. FIG. 10 shows a portion around the tip portion of the nozzle 61 of the ejection unit 110 and the modeling stage unit 200, to schematically illustrate how the 3D object OB is formed on the build plate 220C. The 3D modeling device 100F according to the sixth embodiment is configured similarly to the 3D modeling device 100C of the third embodiment, except for further including a processing chamber 270 and a temperature controller 271.

The processing chamber 270 is formed as an air-tightly sealed closed space, and accommodates therein at least the nozzle 61 and the build plate 220C. The temperature controller 271 includes for example a heater, and adjusts, under the control of the control unit 300, the atmospheric temperature in the processing chamber 270 during the modeling operation. The temperature controller 271 adjusts the atmospheric temperature in the processing chamber 270 to a temperature close to the glass transition temperature Tg of the material. For example, the temperature controller 271 adjusts the atmospheric temperature in the processing chamber 270 to approximately 100° C.

With the 3D modeling device 100F according to the sixth embodiment, since the atmospheric temperature in the processing chamber 270 is raised during the modeling operation, a sharp drop in temperature of the fused material ejected onto the build plate 220C can be suppressed. Therefore, the contraction of the material on the build plate 220C is suppressed, and degradation in modeling accuracy originating from the contraction of the material can also be suppressed. Further, since the modeling operation is executed inside the processing chamber 270, foreign matters such as dust can be prevented from sticking to the object OB being formed. In addition, the 3D modeling device 100F according to the sixth embodiment and the modeling operation performed by the 3D modeling device 100F provide the same advantageous effects described above with reference to the foregoing embodiments. Here, the processing chamber 270 and the temperature controller 271 may also be applied to the 3D modeling device 100A, 100B, 100D, and 100E, according to the first, second, fourth, and fifth embodiments, respectively.

Variations

The configurations described with reference to the foregoing embodiments may be modified, for example as described hereunder. The following variations may be construed as additional embodiments for realizing the invention, like the foregoing embodiments.

First Variation

The heating unit 251 serving as the contraction prevention unit 250A of the 3D modeling device 100A according to the first embodiment may also be applied to the 3D modeling devices 100B to 100F according to the other embodiments. In other words, the heating unit 251 according to the first embodiment may also be provided in the build plates 220B, 220C, 220D, and 220E according to the second to the fifth embodiments, in addition to the configuration of the contraction prevention units 250B, 250C, 250D, and 250E.

Second Variation

The 3D modeling device 100B according to the second embodiment may further include a release material that facilitates the separation of the object OB, on the surface of the serrated layer 252 of the build plate 220C.

Third Variation

In the 3D modeling devices 100C, 100D, 100E, and 100F according to the third, fourth, fifth, and sixth embodiments, it is not mandatory that the fiber layers 253, 254, and 255 serving as the contraction prevention units 250C, 250D, and 250E are removably attached to the build plates 220C, 220D, and 220E, respectively. The fiber layers 253, 254, and 255 may be unified with the build plates 220C, 220D, and 220E. In the 3D modeling device 100A according to the first embodiment, the heating unit 251 may be removably provided to the build plate 220A. The heating unit 251 may be removably inserted inside the build plate 220A, or removably attached to an outer portion of the build plate 220A. In the 3D modeling device 100B according to the second embodiment, the serrated layer 252 may be removably attached to the build plate 220B.

Fourth Variation

In the foregoing embodiments, it is not mandatory that the material supply unit 20 is constituted of a hopper. The material supply unit 20 may be omitted in the ejection unit 110. In addition, it is not mandatory that the material supply unit 20 is configured to supply materials of a solid form to the flat screw 40. The material supply unit 20 may be configured to supply a fused material already plasticized, or a half-melted material in which a part of the component has been plasticized, to the flat screw 40.

Fifth Variation

The 3D modeling devices 100A to 100F according to the foregoing embodiments may include a moving mechanism that three-dimensionally moves the nozzle 61 of the ejection unit 110, instead of the moving mechanism 230 that three-dimensionally moves the build plates 220A to 220E. Alternatively, the moving mechanism may be configured to move one of the nozzle 61 and the build plates 220A to 220E in one or two directions, and move the other in the remaining directions.

Sixth Variation

In the foregoing embodiments, the plasticizing of the material by the plasticizing unit 30 is realized by the heating with the heater 58 and the rotation of the flat screw 40. However, a different method of plasticizing the material may be adopted. For example, a single-axis screw extruder, in which an elongate screw longer in the Y-direction than in the X-direction is inserted in a cylinder around which a heater is provided, may be employed for plasticizing the material. Alternatively, a filament formed of a thermoplastic material may be heated and fused in an extruder formed of a metal in a cylindrical shape, while being transported to a nozzle through the extruder with a motor gear, and squeezed out from the nozzle.

Seventh Variation

A part or the whole of the functions and processings realized by software in the foregoing embodiments may be realized by hardware including a circuit. Conversely, a part or the whole of the functions and processings realized by hardware may be realized by software. The hardware can be exemplified by various types of circuits, such as an integrated circuit and a discrete circuit, and a circuit module composed of a combination of the mentioned circuits.

The invention is not limited to the foregoing embodiments and variations, but may be realized in various different manners within the scope of the invention. For example, the technical features described in the embodiments and variations may be substituted or combined as desired, to eliminate all or a part of the conventional drawbacks, or attain a part or the whole of the foregoing advantageous effects. Further, any of the technical features may be excluded, unless such features are herein described as mandatory.

What is claimed is:

1. A 3D modeling device that forms a 3D object, the 3D modeling device comprising:
   a stage;
   a nozzle through which a fused material is ejected;
   a build plate disposed on the stage, the build plate receiving the fused material ejected through the nozzle to build the 3D object on the build plate; and
   a plasticizing member configured to plasticize a thermoplastic material to form the fused material, the plasticizing member including:
   a flat screw having a grooved surface in which a groove is provided, the groove extending in a helical shape;

a screw-facing piece having a communication path and a screw-facing surface facing the grooved surface; and a drive motor configured to rotate the flat screw, wherein the groove continuously helically extends toward a material inlet from which the thermoplastic material in solid form is supplied, and the material inlet is provided on a side face of the flat screw.

2. The 3D modeling device according to claim 1, wherein a height of the flat screw is smaller than a diameter of the flat screw.

3. The 3D modeling device according to claim 1, further comprising:

a material supply unit connected to the material inlet, the material supply unit loading the thermoplastic material in a form of pellets.

4. The 3D modeling device according to claim 1, wherein the screw-facing surface includes a plurality of guide grooves each connected to the communication path.

5. The 3D modeling device according to claim 1, wherein the build plate includes a contraction prevention member, and the contraction prevention member is configured to prevent the fused material from contracting upon being cured, and the contraction prevention member is a heater that heats the fused material.

6. The 3D modeling device according to claim 1, wherein the build plate includes a contraction prevention member, and the contraction prevention member is configured to prevent the fused material from contracting upon being cured, and the contraction prevention member has a serrated structure.

7. The 3D modeling device according to claim 1, wherein the build plate includes a contraction prevention member, and the contraction prevention member is configured to prevent the fused material from contracting upon being cured, and the contraction prevention member is a fiber layer formed of a fiber, and the fused material is ejected on the fiber layer by the nozzle.

8. The 3D modeling device according to claim 7, wherein the fiber layer is formed of wood or paper.

9. The 3D modeling device according to claim 1, wherein the build plate includes a contraction prevention member, and the contraction prevention member is configured to prevent the fused material from contracting upon being cured, and the contraction prevention member is removably provided on the build plate.

10. The 3D modeling device according to claim 1, further comprising:

a processing chamber accommodating the stage, the nozzle, the build plate, and the plasticizing member; and a temperature controller configured to adjust an atmospheric temperature in the processing chamber.

11. A method of forming a 3D object, the method comprising:

supplying a thermoplastic material in solid form to a plasticizing member from a material inlet, the plasticizing member including:

a flat screw having a grooved surface in which a groove is provided, the groove continuously helically extending in a helical shape;

a screw-facing piece having a communication path and a screw-facing surface facing the grooved surface; and a drive motor configured to rotate the flat screw, wherein the material inlet is provided on a side face of the flat screw;

plasticizing the thermoplastic material between the grooved surface and the screw-facing surface by rotating the flat screw with respect to the screw-facing piece;

transforming the plasticized thermoplastic material into a fused material;

guiding the fused material to a nozzle through the communication path;

ejecting the fused material through the nozzle on a build plate.

* * * * *